(12) United States Patent
Girault et al.

(10) Patent No.: US 7,760,884 B2
(45) Date of Patent: Jul. 20, 2010

(54) CRYPTOGRAPHIC METHOD AND DEVICES FOR FACILITATING CALCULATIONS DURING TRANSACTIONS

(75) Inventors: Marc Girault, Caen (FR); Jean-Claude Pailles, Paris (FR)

(73) Assignee: France Telecom, Paris (FR)

( * ) Notice: Subject to any disclaimer, the term of this patent is extended or adjusted under 35 U.S.C. 154(b) by 1067 days.

(21) Appl. No.: 10/519,698

(22) PCT Filed: Jun. 27, 2003

(86) PCT No.: PCT/FR03/02000

§ 371 (c)(1),
(2), (4) Date: Dec. 27, 2004

(87) PCT Pub. No.: WO2004/006497

PCT Pub. Date: Jan. 15, 2004

(65) Prior Publication Data

US 2005/0213769 A1    Sep. 29, 2005

(30) Foreign Application Priority Data

Jul. 5, 2002   (FR) .................................. 02 08474

(51) Int. Cl.
*H04L 9/08* (2006.01)
*H04L 9/00* (2006.01)
*G06F 7/38* (2006.01)

(52) U.S. Cl. .......................... 380/282; 380/28; 380/30; 380/44; 380/277; 380/285; 708/490; 708/491; 708/492

(58) Field of Classification Search ................. 380/282, 380/28, 44, 277, 30, 285; 708/490, 491, 708/492

See application file for complete search history.

(56) References Cited

U.S. PATENT DOCUMENTS 4,995,082 A    2/1991   Schnorr (Continued)

FOREIGN PATENT DOCUMENTS

FR           2 716 058 A1   8/1995

(Continued)

OTHER PUBLICATIONS

"System for M of M Component Part RSA Digital Signature Generation," (NN97041), IBM Technical Disclosure Bulletin, Apr. 1997.*

(Continued)

*Primary Examiner*—William R Korzuch
*Assistant Examiner*—Sarah Su
(74) *Attorney, Agent, or Firm*—Drinker Biddle & Reath LLP

(57) ABSTRACT

The cryptographic method is used in transactions for which a first entity generates, by use of a private RSA key, a proof verifiable by a second entity by use of a public RSA key associated with said private key. The public key includes an exponent and a modulus. The first entity generates a first element of proof by a calculation that can be performed independently of the transaction, and a second element of proof related to the first element of proof and which depends on a common number shared by the first and the second entities specifically for the transaction. The second entity verifies that the first element of proof is related, modulo the modulus of the public key, to a power of a generic number, with an exponent equal to a linear combination of the common number and of a product of the exponent of the public key by the second element of proof.

27 Claims, 6 Drawing Sheets

U.S. PATENT DOCUMENTS

| | | | |
|---|---|---|---|
| 5,748,782 A | 5/1998 | Ferreira et al. | |
| 5,946,397 A * | 8/1999 | M'Raihi et al. | 380/30 |
| 5,987,138 A * | 11/1999 | Gilbert et al. | 380/30 |
| 6,125,445 A * | 9/2000 | Arditti et al. | 713/169 |
| 6,353,888 B1 * | 3/2002 | Kakehi et al. | 713/168 |
| 6,411,715 B1 * | 6/2002 | Liskov et al. | 380/277 |
| 6,578,144 B1 * | 6/2003 | Gennaro et al. | 713/176 |
| 6,788,788 B1 * | 9/2004 | Kasahara et al. | 380/277 |
| 7,080,254 B1 * | 7/2006 | Guillou et al. | 713/181 |
| 7,155,745 B1 * | 12/2006 | Shin et al. | 726/27 |
| 7,165,181 B2 * | 1/2007 | Brickell | 713/182 |
| 2002/0041683 A1 * | 4/2002 | Hopkins et al. | 380/28 |
| 2002/0080958 A1 * | 6/2002 | Ober et al. | 380/44 |
| 2003/0059041 A1 * | 3/2003 | MacKenzie et al. | 380/28 |
| 2003/0163699 A1 | 8/2003 | Pailles et al. | |
| 2004/0148325 A1 * | 7/2004 | Endo et al. | 708/492 |
| 2008/0104400 A1 * | 5/2008 | Kocher et al. | 713/172 |

FOREIGN PATENT DOCUMENTS

| | | |
|---|---|---|
| FR | 2 752 122 A1 | 2/1998 |
| FR | 2 718 311 A1 | 5/1998 |
| FR | 2 792 142 A1 | 10/2000 |

OTHER PUBLICATIONS

Schneier, "Applied Cryptography," 1996, John Wiley & Sons, 2nd Edition, pp. 466-474.*

Rivest et al., "A Method for Obtaining Digital Signatures and Public-Key Cryptosystems," Communications of the ACM., 21(2), pp. 120-126 (Feb. 1978).

Schnorr, "Efficient Identification and Signatures for Smart Cards," Lecture Notes in Computer Science, Springer Verlag, New York, NY, pp. 239-252 (Aug. 20, 1989).

* cited by examiner

Fig.2
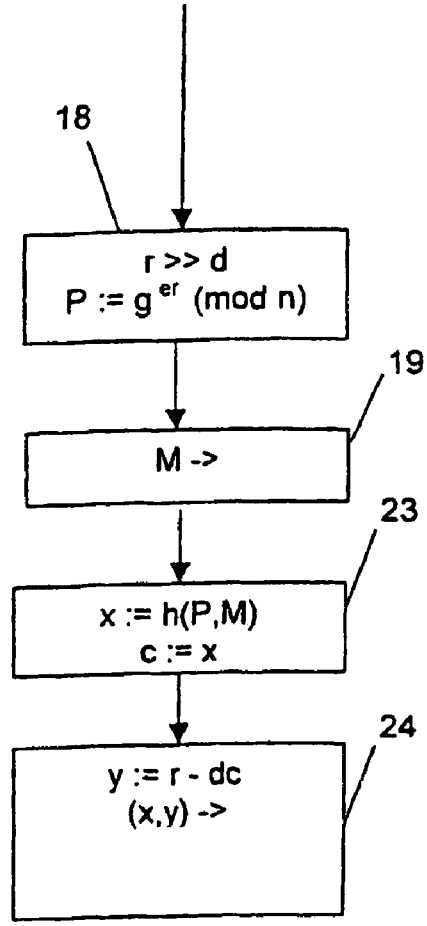
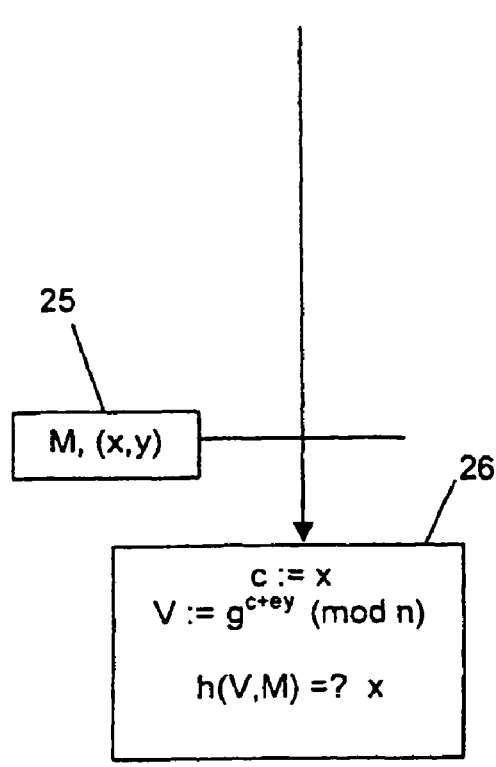

CRYPTOGRAPHIC METHOD AND DEVICES FOR FACILITATING CALCULATIONS DURING TRANSACTIONS

CROSS-REFERENCE TO RELATED APPLICATIONS

This application is the U.S. national phase of the PCT/FR2003/002000 filed Jun. 27, 2003, which claims the benefit of French Application No. 02 08474 filed Jul. 5, 2002, the entire content of which is incorporated herein by reference.

BACKGROUND OF THE INVENTION

The invention relates to the technical field of cryptography, and more precisely to what is called public key cryptography. In this type of cryptography, a user owns a pair of keys for a given use. Said pair of keys consists of a private key that this user keeps secret and an associated public key that this user may communicate to other users. For example, in the case of a pair of keys dedicated to confidentiality, the public key is then used to encipher the data, whereas the secret key is used to decipher it, that is to say to re-establish this data in clear.

Public key cryptography is very widely used insofar as, unlike secret key cryptography, it does not require the interlocutors to share the same secret in order to establish a security-protected communication. However, this advantage in terms of security is accompanied by a disadvantage in terms of performance, since public key cryptography methods, also called "public key schemes", are often one hundred or one thousand times slower than secret key cryptography methods, also called "secret key schemes". A very great challenge is therefore to find public key cryptography methods that can be rapidly executed so as to be able to use them in resource-limited environments, such as standard microprocessor cards, with or without contacts.

Most public key schemes existing at the present time rely on the difficulty of mathematical problems in the field of arithmetic (or "number theory"). Thus, the security of the RSA (Rivest, Shamir, Adleman) numerical signature and encryption scheme is based on the difficulty of the problem of factorizing integers: given a very large integer (having more than 500 digits) obtained privately by multiplying together two or more prime numbers of comparable size, no effective method exists at the present time for recovering these prime numbers.

Other public key schemes, such as the digital signature scheme described in patent application FR-A-2 716 058, rely for their security on the difficulty of what is called the "discrete logarithm problem". This problem may be expressed in its most general case as follows: let E be a set provided with an operation (i.e. with a function which, having two elements a and b, associates an element denoted "a·b" or "ab", and called the "product of a and b"), let g be an element of E, let r be a large integer and let y be the integer defined by: $y = g^r$ (that is to say the product $g \cdot g \cdot \ldots \cdot g$, with g occurring r times); it is then unfeasible to recover r from g and y. Often the set E used is the set of integers modulo n, where n is an integer, a prime number or a number composed of prime numbers.

The invention relates more particularly to the technical field of entity authentication, also called "identification", and also that of the authentication of a message and of its digital signature by means of public key cryptographic techniques. In such methods, the authenticated entity, called the "prover", possesses a secret or private key and an associated public key. The prover uses the secret key to produce an authentication value or a digital signature. The authenticating entity, called the "verifier", needs only the public key of the prover to verify the authentication value or the digital signature.

The field of the invention is more particularly still that of the so-called "zero-knowledge" authentication methods. This means that the authentication takes place using a protocol which, in a proven manner, reveals nothing about the secret key of the authenticated entity, irrespective of the number of times it is used. From this type of scheme it is known how to deduce, using standard techniques, schemes for authenticating a message and a digital signature of this message.

The field of the invention is more particularly still that of methods whose security relies both on the difficulty of the problem of factorizing integers and on the difficulty of the discrete logarithm problem.

The invention is applicable in any system using public key cryptography to protect the security of their elements and/or their transactions, and more particularly in systems in which the number of calculations performed by the various parties constitutes, at least for one of them, a critical parameter, either because it does not have available a coprocessor specialized in cryptographic calculations, often called a "cryptoprocessor", so as to speed up the calculations, or because it is capable of carrying out a large number of calculations simultaneously, for example in the case of central server, or for any other reason.

A typical application is electronic payment, by bank card or by electronic purse. In the case of proximity payment, the payment terminal is in a public place, prompting the use of public key cryptography methods, so as not to store a master key. To reduce the overall costs of such a system, it may be desirable either for the card to be a standard microprocessor card, that is to say a card not provided with a cryptoprocessor, or for the security-protected microprocessor contained in the terminal itself to be of standard type, or for both of these. Depending on the case and on the cryptographic method adopted, the prior art known at the present time does achieve one or other of these objectives, but does not allow both to be easily achieved simultaneously, while complying with the constraints of the system. An example of such a constraint is that the payment shall be effected in less than one second, or even in less than 150 milliseconds in the case of a contactless transaction, or even in a few milliseconds in the case of a freeway toll.

The cryptographic method most widely used at the present time is the RSA method. It is based on the problem of factorization. This algorithm, standardized in various instances, has become a de facto standard. It will remain the predominant algorithm in years to come. Many products, systems and infrastructures, such as PKI (Public Key Infrastructure) infrastructures, have been designed from this algorithm and from the formats of the keys that it uses.

As is known, according to this algorithm the public key consists of a pair of integers (n,e) and the private key consists of an integer d. The modulus n is an integer large enough for it to be unfeasible to factorize it. An entity A which, alone, holds the private key d, is the sole entity capable of generating an integer W' equal to a power of the integer W modulo n with d as exponent, so as to allow any entity B knowing the public key (n,e) to recover the integer W by raising the integer W' to a power modulo n with e as exponent.

In a method using a message signature M, the integer W is generally an image of the message via a function such as a known hash function. The prover is the entity A, the signature is the integer W', the verifier is the entity B which verifies that the integer found, based on the signature W', is the image of the message via the known function.

In a method of identification, the integer W generally constitutes a challenge sent by the entity B, which is the verifier. The number W' generated by the entity A, which is the prover, constitutes the response to this challenge.

In a method of authenticating the message M, the integer W generally results from a combination of an image of the message M and of a challenge sent by the verifier consisting of the entity B. The number W' generated by the entity A, which is the prover, constitutes an authentic signature in response to this challenge.

However, the RSA algorithm has a problem stemming from the large number of operations to be carried out by the prover or the signer. To carry out a complete calculation in less than one second on a microprocessor card performing these operations, it is necessary to add a cryptoprocessor to the card. However, the fabrication and installation of a cryptoprocessor have a not inconsiderable cost, which increases the cost of the microprocessor card. It is also known that a cryptoprocessor consumes a large amount of current. Supplying the card via the terminal may pose technical difficulties in the case of a contactless interface. It is also known that the addition of a cryptoprocessor facilitates physical attack by spectral analysis of the current consumed, which presents a drawback to which it is difficult to find technical solutions. Moreover, even if the card is provided with a cryptoprocessor, the calculation may still prove too slow in applications in which the transaction time needs to be very short, as in certain of the examples mentioned above.

The object of the present invention is to specify public key cryptographic methods such as authentication and digital signature methods. More precisely, the object of the present invention is to use the same keys as the RSA algorithm with a level of security at least equal to that of this algorithm, while still allowing a large majority of the calculations to be carried out in advance, which avoids having to use a cryptoprocessor.

SUMMARY OF THE INVENTION

Considering a cryptographic method that can be used in a transaction for which a first entity generates, by means of an RSA private key, a proof verifiable by a second entity by means of an RSA public key associated with said private key, said public key comprising a first exponent and a modulus, the method according to the invention is noteworthy in that:
  the first entity generates a first element of proof, a first calculation of which, consuming considerable resources, can be executed independently of the transaction;
  the first entity generates a second element of proof related to the first element of proof and dependent on a common number shared by the first and second entities specifically for the transaction, a second calculation of which consumes few resources; and
  the second entity verifies that the first element of proof is related through a relationship with a first power modulo the modulus of a generic number having a second exponent equal to a linear combination of all or part of the common number and of the public key first exponent multiplied by the second element of proof.

The fact that the keys are of the RSA type has the advantage of being able to use, without any modification, many existing products, developments or infrastructures, such as key production software, descriptions of microprocessor memory regions, public key certificate formats, etc.

Since the first element of proof can be calculated completely or partly independently of the transaction, the first entity has the possibility of carrying out a complex calculation prior to the transaction, while keeping the execution of this complex calculation secret in order to guarantee security. Thus, it may be seen that a first entity rapidly generates such a first element of proof right from the start of the transaction without requiring powerful resources, such as those of a cryptoprocessor. Only the first entity is then capable of generating the second element of proof by relating it to the first element of proof so as to make, through simple operations, the second element of proof depend on a common number specifically shared by the transaction. The possible execution of these simple operations in a short time by the first entity avoids slowing down the transaction, while still maintaining a high level of security.

Without being limited, the object of the transaction may be to identify the first entity, to sign a message or to authenticate a message.

In particular, to allow the first entity to be identified:
  the first element of proof is generated by the first entity by raising the generic number to a second power modulo the modulus having a third exponent equal to the public key first exponent multiplied by a random integer kept secret by the first entity;
  the common number is chosen randomly from within a security interval and then sent by the second entity after having received the first element of proof; and
  the relationship verified by the second entity is an equality relationship between a power of the first element of proof and the first power of the generic number.

The complex calculation, the execution of which is kept secret, relates in this case to the raising to the second power of the generic number in order to generate the first element of proof. The choice of the common number, chosen at random during the transaction, does not impair the speed of this transaction.

In particular, in order to allow a message to be signed:
  the first element of proof is generated by the first entity by applying a standard hash function to the message and to the generic number raised to a second power modulo the modulus having a third exponent equal to the public key first exponent multiplied by a random integer kept secret by the first entity;
  the common number is equal to the first element of proof; and
  the relationship verified by the second entity is an equality relationship between the common number and a result of the standard hash function applied to the message and to the first power of the generic number.

The complex calculation whose execution is kept secret relates in this case to the raising to the second power of the generic number in order to generate a potential of proof. The application of the standard hash function to the message and to this potential of proof no longer consumes considerable resources. The first entity may in this case calculate the potential of proof before the transaction in which transmission of the second element of proof and of the first element of proof equal to the common number shared with the second entity, then constitutes transmission of the signature of the message.

In particular, in order to authenticate that a message received by the second entity comes from the first entity:
  the first element of proof is generated by the first entity by applying a standard hash function to the message and to the generic number raised to a second power modulo the modulus having a third exponent equal to the public key first exponent multiplied by a random integer kept secret by the first entity;

the common number is chosen at random from within a security interval and then sent by the second entity after having received the first element of proof; and the relationship verified by the second entity is an equality relationship between the first element of proof and a result of the standard hash function applied to the message and to the first power of the generic number.

The complex calculation kept secret relates here to the raising to the second power of the generic number in order to generate the first element of proof. The choice of the common number, chosen at random during the transaction by the second entity, does not impair the speed of this transaction.

In general, the complex calculation that can be carried out before the transaction does not directly involve the private key and its result therefore gives no information about the private key.

More particularly, the cryptographic method is noteworthy in that:
the second element of proof is generated by the first entity by subtracting, from the random integer, the private key multiplied by the common number;
the linear combination equal to the second exponent comprises a positive unitary coefficient for the common number and a positive unitary coefficient for the public key first exponent multiplied by the second element of proof; and
in the verified relationship, the first element of proof is considered with a unitary exponent power.

Alternatively, and preferably when the common number is chosen by the second entity, the cryptographic method is noteworthy in that:
since the common number is split into a first elementary common number and a second elementary common number, the second element of proof is generated by the first entity by subtracting, from the random integer multiplied by the first elementary common number, the private key multiplied by the second elementary common number;
the linear combination equal to the second exponent comprises a zero coefficient for the first elementary common number, a positive unitary coefficient for the second elementary common number and a positive unitary coefficient for the public key first exponent multiplied by the second element of proof; and
in the verified relationship, the first element of proof is considered with an exponent power equal to the first elementary common number.

The simple subtraction and multiplication operations described above make it possible to rapidly calculate the second element of proof within a transaction and to repeat the transaction several times by generating each time a second element of proof related to another first element of proof via a different random number, without giving any information about the private key.

Advantageously, the cryptographic method is noteworthy in that the second element of proof is calculated modulo an image of the modulus via a Carmichael function or modulo a multiple of the order of the generic number modulo the modulus.

The random integer may be chosen to be very much greater than the private key. If the advantage mentioned in the previous paragraph is not applied, it is necessary for the random integer to be very much greater than the value of the private key. Advantageously, in order to reduce the number of operations needed for the exponentiation with the random number as exponent, the random integer is less than an image of the modulus via a Carmichael function or less than a multiple of the order of the generic number modulo the modulus. Such a random number cannot give any exploitable information about the private key.

By reducing the size of the second element of proof thus obtained, it is possible to speed up the calculations to be made by the second entity without impairing security.

Also advantageously, the cryptographic method is noteworthy in that the third exponent is calculated modulo an image of the modulus via a Carmichael function or modulo a multiple of the order of the generic number modulo the modulus.

By reducing the size of the third exponent thus obtained, it is possible to speed up the calculations to be made by the first entity without impairing security.

A value two assigned to the generic number facilitates the exponentiations to any power of the generic number. A small value may also be assigned to the generic number that makes it possible to distinguish each first entity, by applying a known hash function to the modulus and to the first exponent of the public key.

An appreciable improvement to the cryptographic method for distinguishing the first entity is one whereby the generic number is transmitted with the public key, the generic number being equal to a simple number raised to a power modulo the modulus with the private key as exponent.

All that the first entity then has to do is to raise the simple number to a power modulo the modulus with the random number as exponent so as to obtain the same result as by raising the generic number to a second power modulo the modulus having a third exponent equal to the public key first exponent multiplied by a random integer. By assigning the value two to the simple number, the complex calculation is considerably speeded up, whether this is carried out before or during the transaction.

A further appreciable improvement to the cryptographic method is one whereby:
a third entity receives the second element of proof, generates a third element of proof by raising the generic number to a power modulo the modulus with the second element of proof as exponent and sends the third element of proof to the second entity; and
the second entity raises the third element of proof to a power modulo the modulus with the first exponent and multiplies the result thereof by the generic number raised to a power whose exponent is the common number in order to verify the relationship which relates the first element of proof to the second element of proof.

The third entity makes it possible to relieve the second entity without impairing the integrity of the verification.

Considering an intrusion-protected prover device provided with an RSA private key kept secret, in order to generate, during a transaction with a verifier device, a proof whose verification by means of a public key associated with said private key makes it possible to guarantee that the prover device is the origin of said proof, said RSA public key comprising a first exponent and a modulus, the prover device according to the invention is noteworthy in that it comprises:
calculation means designed to generate a first element of proof, a first calculation of which consumes considerable resources, can be executed independently of the transaction and to generate a second element of proof related to the first element of proof and dependent on a common number specific to the transaction; and
communication means designed to transmit at least the first and the second elements of proof and designed to transmit said common number to the verifier device or to receive said common number therefrom.

In particular, the prover device according to the invention is noteworthy in that:

the calculation means are, on the one hand, designed to generate a first random number and to raise a generic number to a power modulo the modulus having an exponent equal to the public key first exponent multiplied by the random integer; and the calculation means are, on the other hand designed to generate the second element of proof by taking the difference between the random integer and the private key multiplied by the common number.

Alternatively, the calculation means are designed to carry out operations modulo an image of the modulus via a Carmichael function or modulo a multiple of the order of the generic number modulo the modulus.

Considering a verifier device for verifying that a proof originates from a prover device provided with an RSA private key kept secret by the prover device, by means of a public key associated with said private key, said RSA public key comprising an exponent and a modulus, the verifier device according to the invention is noteworthy in that it comprises:

communication means designed to receive a first element of proof and a second element of proof or a third element of proof, and to receive or transmit a common number specific to a transaction within which the first and the second or the third element of proof are received; and calculation means designed to verify that the first element of proof is related through a relationship, modulo the modulus, with a first power of a generic number having a second exponent equal to a linear combination of the common number and of the public key first exponent multiplied by the second element of proof.

In particular, the verifier device is noteworthy in that the communication means are designed to receive the second element of proof and in that the calculation means are designed to calculate the second exponent and said first power of the generic number.

Alternatively, the verifier device is noteworthy in that the communication means are designed to receive the third element of proof and in that the calculation means are designed to raise the third element of proof to a power of the public key first exponent in order to multiply the result thereof by the generic number raised to a second power having the common number as exponent.

BRIEF DESCRIPTION OF THE DRAWINGS

FIG. 2 shows steps of the method according to the invention for signing a message;

DESCRIPTION OF PREFERRED EMBODIMENTS

The embodiment described here is an entity authentication or identification method. It allows a prover A to convince a verifier B of its authenticity. This method may be transformed into a method of authenticating a message or digital message signature as explained below. Its security relies on the difficulty of factorizing large integers. This difficulty is known to those skilled in the art as being at least as great as the difficulty of the problem on which the security of the RSA algorithm relies. In one option allowing the verification task to be facilitated, the security of the method is equivalent to RSA security.

It will be recalled that a prime number is a number divisible only by one and by itself. It will also be recalled that the Euler function $\phi(z)$ of any positive integer z gives the cardinal number of the set of positive integers less than z and coprime to z, that is to say having no common factor with z other than 1. It will also be recalled that the Carmichael function $\lambda(w)$ of any positive integer w gives the smallest strictly positive integer v such that any integer u satisfies the relationship $\{u^v = 1 \text{ modulo } w\}$, that is to say, as is known, the remainder of the integer division of $u^v$ by w is equal to 1.

According to the objective and to the results explained above, this method uses RSA keys. In order to constitute a prover device, a first entity A possesses firstly a public key disclosed to any second entity B, which constitutes a verifier device. The first entity A secondly possesses a private key kept secret. The public key comprises a modulus n and a first exponent e. The private key comprises a second exponent d. The modulus n is an integer equal to the product of two or more prime numbers. When the number n is a product of two prime numbers p and q, then $\phi(n)=(p-1)(q-1)$. Many RSA descriptions specify that the modulus n, the first exponent e and the second exponent d satisfy the equation $\{ed=1 \text{ modulo } \phi(n)\}$. It is well known to those skilled in the art that when the equation $\{ed=1 \text{ modulo } \phi(n)\}$ is satisfied, then the equation $\{ed=1 \text{ modulo } \lambda(n)\}$ is satisfied.

More generally, the method operates with the same level of security for any public key (n,e) associated with a private key d that satisfies the equation $\{ed=1 \text{ modulo } \lambda(n)\}$.

In all the options, it is assumed that the verifier B already knows all the public parameters needed to verify that a proof is given by a first entity, the prover A, namely its identity, its public key, its public key certificate, etc.

Figure 1:
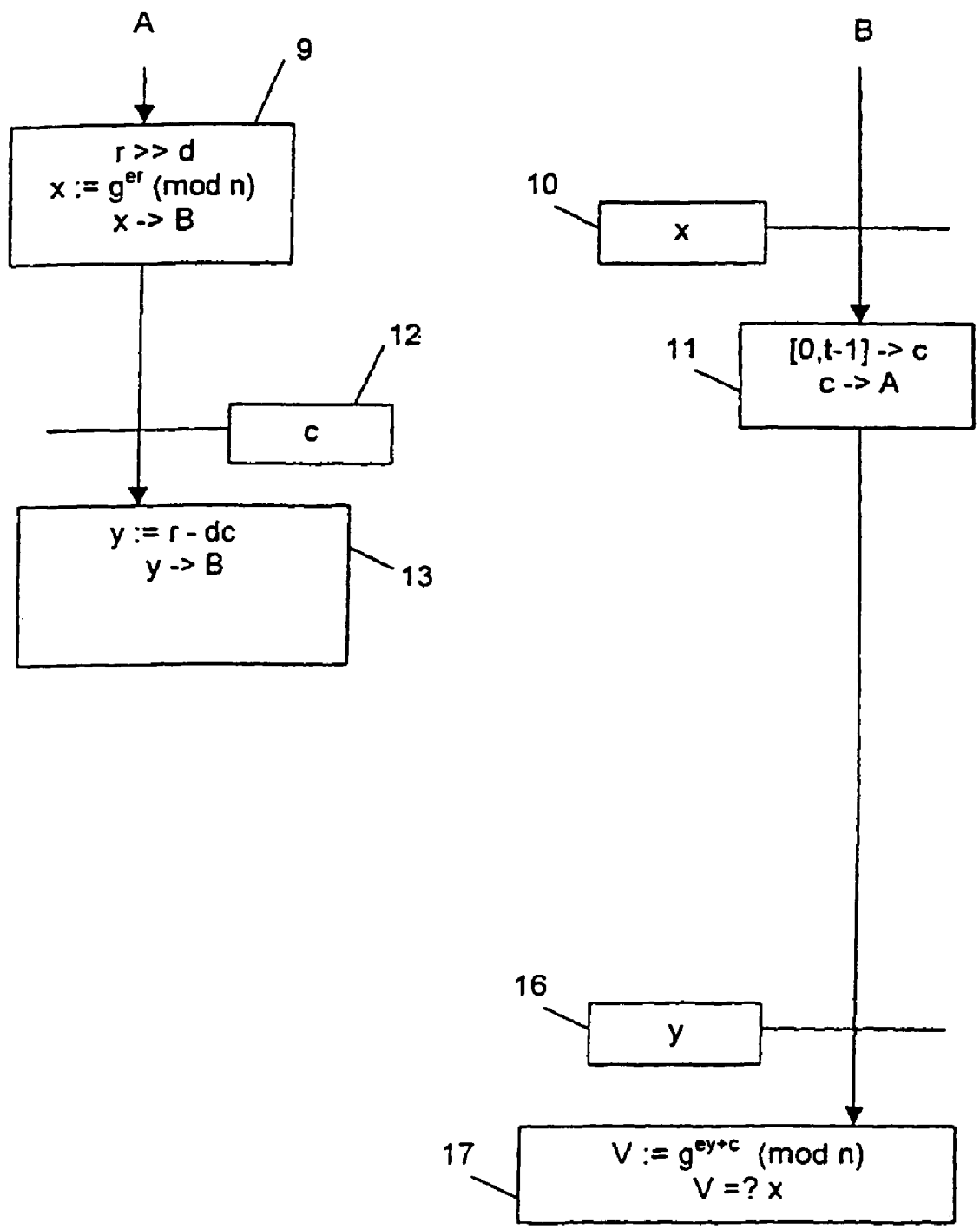
FIG. 1 shows steps of the method according to the invention for identifying a first entity.

Identification of the entity A by the entity B takes place by iterating the protocol described here with reference to FIG. 1 k times. The number k is a positive integer which, with an integer t less than or equal to the exponent e, defines a pair of security parameters.

In a first step 9, the entity A generates a first random integer r very much greater than d, calculates $x=g^{er} \pmod{n}$ and sends x to the entity B. In a known manner, the entities A and B are of the computer or chip card type. The integer g is a generic number known by the entities A and B. A value of the generic number g, equal to 2 facilitates its exponentiations. The generic number g may also be a function of the prover's public key, for example $g=h(n,e)$, where h is a hash function known to all. The generic number g may also be determined by the entity A and then transmitted with its public key. For example, the entity A raises a simple number G to the power d, the result of which gives the number g such that $g^e \pmod n = G$. Since the generic number g is calculated once and for all by the entity A, the calculation of x is simplified, as in this case $x=G^r \pmod n$. A value of the simple number G equal to 2, facilitating its exponentiations, is more particularly advantageous. The expression (mod n) means modulo n, that is to say, as is known, the result of the calculation is equal to the remainder of the integer division of the result of the operation in question by the integer n, generally called the modulus. Here, the integer x constitutes a first element of proof, as only the entity that generates the random number r is capable of generating the number x. The random number r is not communicated by the entity that generates it. From known number theory, the number r is chosen to be large enough so that knowledge of the generic number g or of the simple number G and of the modulus n does not allow the number r to be recovered from the number x.

Receipt by the entity B of the first element of proof x validates a transition 10, which then activates a second step 11.

In step 11, the entity B sends to the entity A an integer c chosen at random from within an interval [0,t−1] called the security interval. Thus, the number c is common to the entities A and B and also to any other entity infiltrating the dialogue between the entities A and B.

Receipt of the common number c by the entity A validates a transition 12, which then activates a third step 13.

In step 13, the entity A calculates y=r−dc. Thus, the entity A generates an image y of the private key in the form of a linear combination of the number r and of the number d, the multiplicative coefficient of which is the common number c. Since the random number r is very large and not communicated, knowledge of the image y does not allow the product dc to be recovered and consequently prevents recovery of the private key number d, which therefore remains kept secret by the entity A. Since only the entity A knows the number d, only the entity A can generate an image that integrates the common number c.

Considering the protocols described here, an imposter is an entity that attempts to pass off as the entity A without knowing the secret of the private key d. It can be demonstrated that, when the factorization of the integers is a difficult problem, the probability of the imposter not being detected is equal to 1/kt. The security of these protocols is therefore at least as great as that of RSA. For many applications, the product kt may be chosen to be relatively small within an authentication context, for example of the order of $2^{16}$.

Any values of k and t of the pair of security parameters are possible. Preferably, k=1 and t=e, in which case the probability defined above is equal to 1/e and there is only one verification equation to be applied. A standard RSA public exponent value such that e=65537, i.e. $2^{16}$+1, is suitable for many applications.

Receipt by the entity B of the second element of proof y validates a transition 16, which then activates a fourth step 17.

In step 17, the entity B verifies that $g^{ey+c}=x(\mod n)$. Although, as seen above, the second element of proof communicates no information about the private key d, the second element of proof y is such that:

$ey+c=e(r−dc)+c$.

Therefore, by raising the generic number g to a power whose exponent is a linear combination of the common number c and the product ey, then:

$g^{ey+c}=g^{er}(g^{-ed+1})^c=x(\mod n)$.

Moreover, although according to number theory the generic number g communicates no information about the private key, the generic number g is in fact such that:

$(g^{dc})^e=g^c(\mod n)$.

Thus, without communicating r at any time, the equality:

$(g^y)^e g^c=(g^r)^e=x(\mod n)$ certifies that the entity A knows d.

This verification is speeded up by calculating in advance, at the end of step 11 or even before it:

$v'=g^c(\mod n)$.

Thus, in the fourth step, B no longer has to verify: $g^{ey}v'=x$ (mod n). When B receives y, it is advantageous for B to calculate once and for all $G=g^e(\mod n)$ so as to verify, in step 11, $G^yv'=x(\mod n)$. Other possible ways of optimizing the verification calculation will be given in the rest of the description.

Many different ways of optimizing this basic protocol are possible. For example, $x=g^{er}$ (mod n) may be replaced with $x=g^{-er}(\mod n)$, in which case the verification equation becomes $g^{ey+c}x=1(\mod n)$.

Again, for example, it is possible to replace c with a pair of positive or negative integers (a,b) and to replace y=r−dc with y=ar−bd, in which case the verification equation becomes $g^{ey+b}=x^a(\mod n)$.

If the prime number factors of the modulus n are known from A, then the first step may be speeded up using what is called the "Chinese remainders" technique.

The first step may be carried out in advance. Moreover, the k values of x may form part of A's public key, in which case the protocol commences directly at the second step. These values of x may also be calculated by an external entity worthy of confidence and stored in the entity A.

When the precalculated values of the first element of proof are joined to the public key, the protocol within a transaction commences directly with step 11. It is the entity B which decides on the number k of iterations of steps 11 and 13 for each of which the entity B verifies, in step 17, that there exists a value of the first element of proof x that is equal to V. The entity A is again the only one to know the random numbers that correspond to a first element of proof.

To be able to store a maximum number of precalculated values in a memory of the entity A, particularly when the entity A is integrated in a microcircuit of a chip card, in the case of a credit card or a mobile telephone, the number x may be replaced with a value f(x) where f is a function, for example equal to (or including) a cryptographic hash function, in which case the verification equation becomes: $f(g^{ey+c}(\mod n))=f(x)$.

All or some of the above modifications may be combined.

One useful improvement to the method consists in storing an image λ(n) of the modulus n via the Carmichael function in the memory of the entity A.

So as to reduce the size of the second element of proof y, in order to reduce the verification time without thereby modifying the verification equation, the second element of proof y is calculated modulo λ(n) in step 13. In this method of implementation, the random number r is advantageously chosen to be less than λ(n) in step 11. More generally, the expression {y=r−dc} may be replaced with any expression {y=r−dc−iλ(n)}, where i is any integer, preferably a positive integer.

So as to speed up execution of step 11, prior to the exponential operation applied to the generic number g, the product er is calculated modulo λ(n).

An equivalent means consists in replacing λ(n) with the order of g modulo n, that is to say the smallest non zero integer l such that $g^l=1$ modulo n, or more generally by any multiple of this order l.

Figure 5:
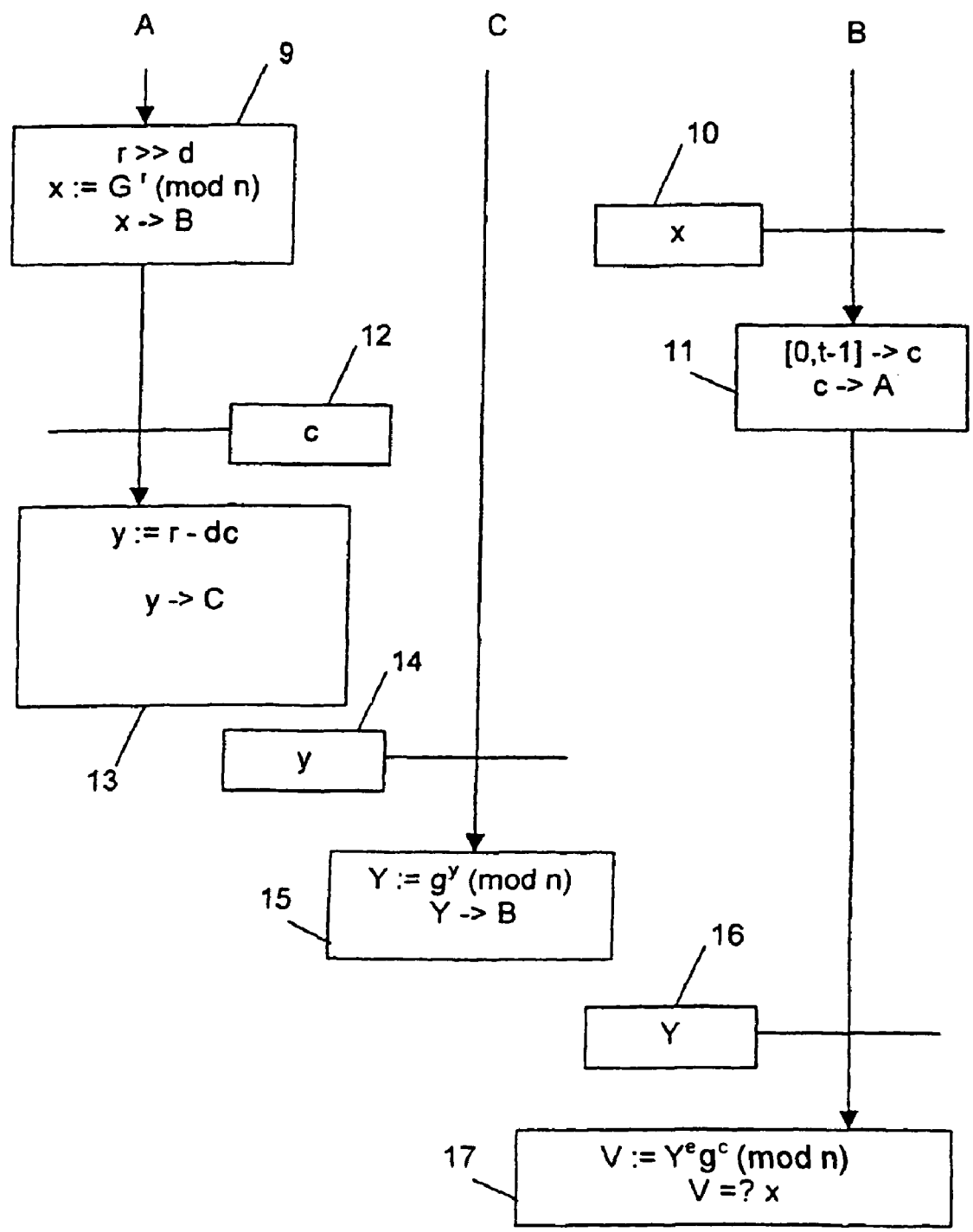
FIG. 5 shows a second variant of the authentication method involving an intermediate entity.

Referring to FIG. 5, the verification calculation executed by the entity B may also be partially delegated to any entity other than B, without any loss of security. In this case, A supplies the second element of proof y to this other entity C. The entity C generates a third element of proof Y from the second element of proof y and sends the third element of proof Y to the entity B. Firstly, knowing y provides no information about d, since the product dc is "masked" by the random number r. Secondly, it is virtually impossible for a fraudster to manufacture Y from all parts, that is to say without the second element of proof y being exclusively generated by the first entity A. This is because, given n, e, x and c, it is unfeasible to find a value of Y that satisfies the verification equation of the fourth step if the factorization is a difficult problem.

The public key is the pair (n,e) and the authentication or identification of the entity A by the entity B takes place by iterating the protocol described here k times, where C denotes any entity other than B. Compared with other protocols of the prior art in which, for example, in the discrete logarithm case the public key is a quadruplet (n, e, g, v), the reduction in number of components of the public key reduces the number of operations to be carried out without impairing security. Advantageously, according to the invention, the public key used here is of RSA type, the protocol described being easily integrated into a widely exploited RSA context.

The method is carried out in a manner identical to that described with reference to FIG. 1 up to step 13. With reference to FIG. 5, step 13 is modified in that the entity A sends the image y of the private key d to the intermediate entity C. As seen above, the image y gives no information about the private key.

Receipt by the entity C of the image y validates a transition 14, which therefore activates the fifth step 15.

In step 15, it is in this case the intermediate entity C that calculates the third element of proof $Y=g^y \pmod n$ and sends Y to B.

The procedure then continues in the same way as that described with reference to FIG. 1 via the transition 16 and step 17. However, step 17 is modified in that the second entity B now has only to raise the third element of proof Y to a power of exponent e and to multiply the result thereof by $g^c \pmod n$.

Physically, the intermediate entity C is, for example, incorporated into a chip, which is not necessarily security protected, contained in the security device of the prover, such as a chip card, in the security device of the verifier, such as a payment terminal, or else in another device, such as a computer. The security lies in the fact that the entity C cannot by itself find a suitable value Y, that is to say such that the verification equation is satisfied.

The protocols described above may be converted into message authentication protocols or into digital signature schemes.

Figure 3:
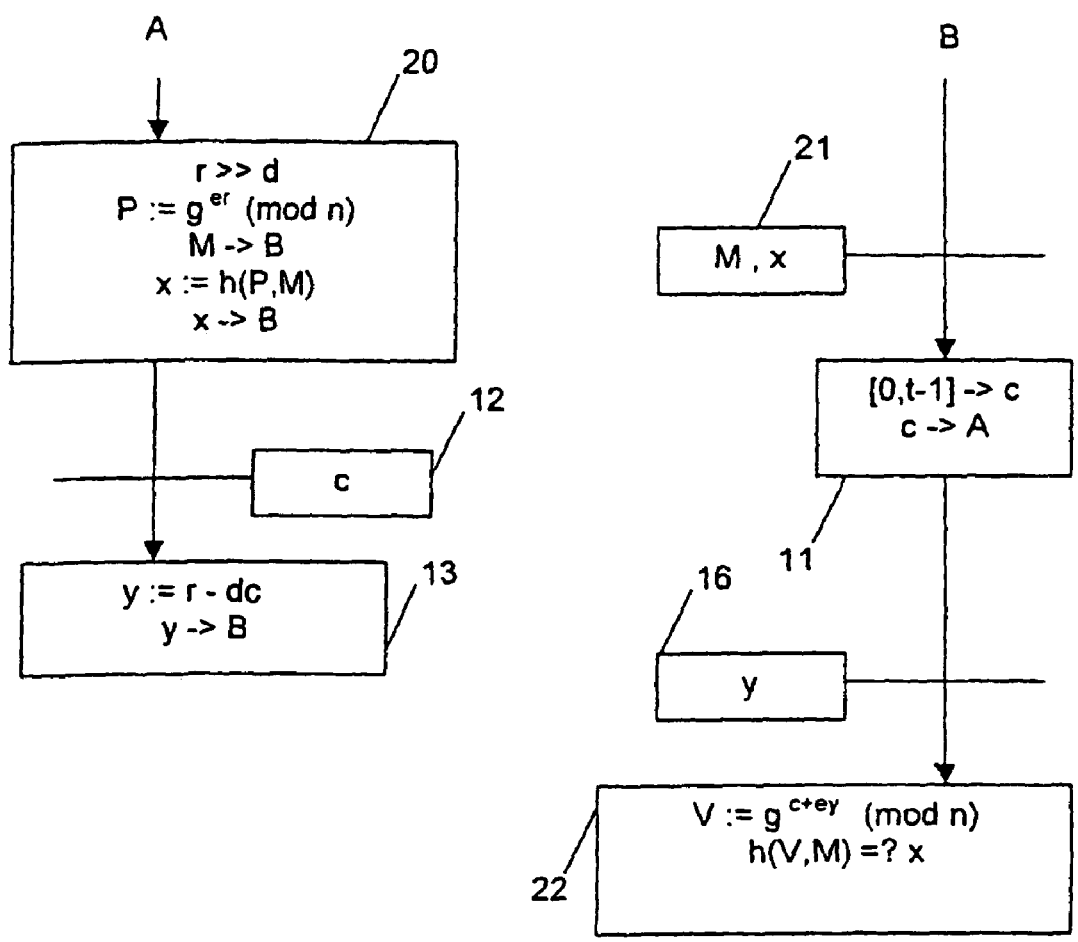
FIG. 3 shows steps of the method according to the invention for authenticating a message.

FIG. 3 shows steps of a method that makes it possible to authenticate that a message M received by the second entity B was sent by the first entity A.

In a first step 20, the entity A generates a first random integer r very much greater than d and calculates a potential of proof P using a formula such that $P=g^{er} \pmod n$ as in step 9 in the case of the first element of proof. Instead of sending P to the entity B, the entity A generates a first element of proof x by applying, to the message M, jointly with the number P, a function h equal, for example, to a cryptographic hash function or including a cryptographic hash function such that:

$$x=h(P,M).$$

Next, the entity A sends the message M and the first element of proof x to the entity B.

Receipt of the message M and of the first element of proof x by the entity B validates a transition 21, which activates a second step 11. The procedure then continues in the same way as that described with reference to either FIG. 1 or FIG. 5.

In step 11, the entity B sends the entity A an integer c chosen at random from within an interval [0,t−1] called the security interval. Thus, the number c is common to the entities A and B and also to any other entity infiltrating the dialogue between the entities A and B.

Receipt by the entity A of the common number c validates a transition 12, which then activates a third step 13.

In step 13, the entity A calculates y=r−dc. Thus, the entity A generates an image y of the private key in the form of a linear combination of the number r and the number d, the multiplicative coefficient of which is the common number c. Since the random number r is very large and not communicated, knowledge of the image y does not allow the product dc to be recovered, and consequently does not allow recovery of the private key number d that therefore remains kept secret by the entity A. Since only the entity A knows the number d, only the entity A can generate an image that integrates the common number c. In the example, shown in FIG. 3, the entity A sends the private key image y to the entity B, but may also send it to an intermediate entity C as in FIG. 5. As was seen previously, the image y gives no information about the private key.

Receipt of the image y by the entity B validates a transition 16, which then activates the fourth step 22.

In step 22, the entity B calculates, as in step 17, a verification value V by means of the formula:

$$V=g^{c+ey} \pmod n$$

and then verifies the match of the second element of proof with the first element of proof by means of the verification equation:

$$h(V,M)=x.$$

In the variant using a function f, the verification equation becomes $h(f(g^{c+ey} \pmod n)),M)=x$.

In the variant using a function f and involving the intermediate entity C, the verification equation becomes $h(f(Y^e g^c \pmod n)),M)=x$.

Unlike the message authentication, the message signature is independent of the sender in the sense that the signature of a message M by the entity A remains valid if the entity B receives the message M from any other entity. A size not less than twenty-four bits for the public key exponent e is recommended in order to guarantee an acceptable level of security.

Referring to FIG. 2, in a first step 18, the entity A generates a first random integer r and calculates a potential of proof $P=g^{er} \pmod n$.

In a second step 23 directly after step 19, the entity A generates a first element of proof x by applying, to the message M, jointly with the number P, a function h, for example equal to a cryptographic hash function or including a cryptographic hash function, such that:

$$x=h(P,M).$$

In step 23, the entity A generates the common number c taken equal to the first element of proof x.

In a third step 24 directly after step 23, the entity A calculates y=r−dc. Thus, the entity A generates an image y of the private key in the form of a linear combination of the number r and the number d, the multiplicative coefficient of which is the common number c. Since the random number r is very large and not communicated, knowing the image y does not allow the product dc to be recovered and consequently does not allow recovery of the private key number d, which therefore remains kept secret by the entity A. Since only the entity A knows the number d, only the entity A can generate an image that integrates the common number c. As was seen above, the image y gives no information about the private key. The pair (x,y) constitutes a signature of the message M since this pair integrates both the message M and a private key element that guarantees that the entity A is the source of this signature.

The entity A then sends the message M and the signature (x,y) to the entity B or to any other entity that will subsequently be able to send the signed message to the entity B.

It should be noted that the message M is not necessarily sent at step 24. The message M may be sent in step 19 independently of its signature, since any modification of the message M would have a negligible chance of being compatible with its signature.

Receipt by the entity B of the message M with its signature (x,y), originating from the entity A or from any other entity, validates a transition 25, which then activates a step 26.

In step 26, the entity B takes the common number c as being equal to the first element of proof x.

In step 26, the entity B calculates, as in step 17, a verification value V by means of the formula:

$$V = g^{c+ey} \pmod{n}$$

and then verifies the match of the second element of proof with the first element of proof by means of the verification equation:

$$h(V,M) = x$$

In this case, the match with the first element of proof is verified by this equality owing to the fact that the common number c generated in step 23 itself matches the first element of proof.

In the variant using a function f, the verification equation becomes $h(f(g^{c+ey} \pmod n)), M) = x$.

Figure 4:
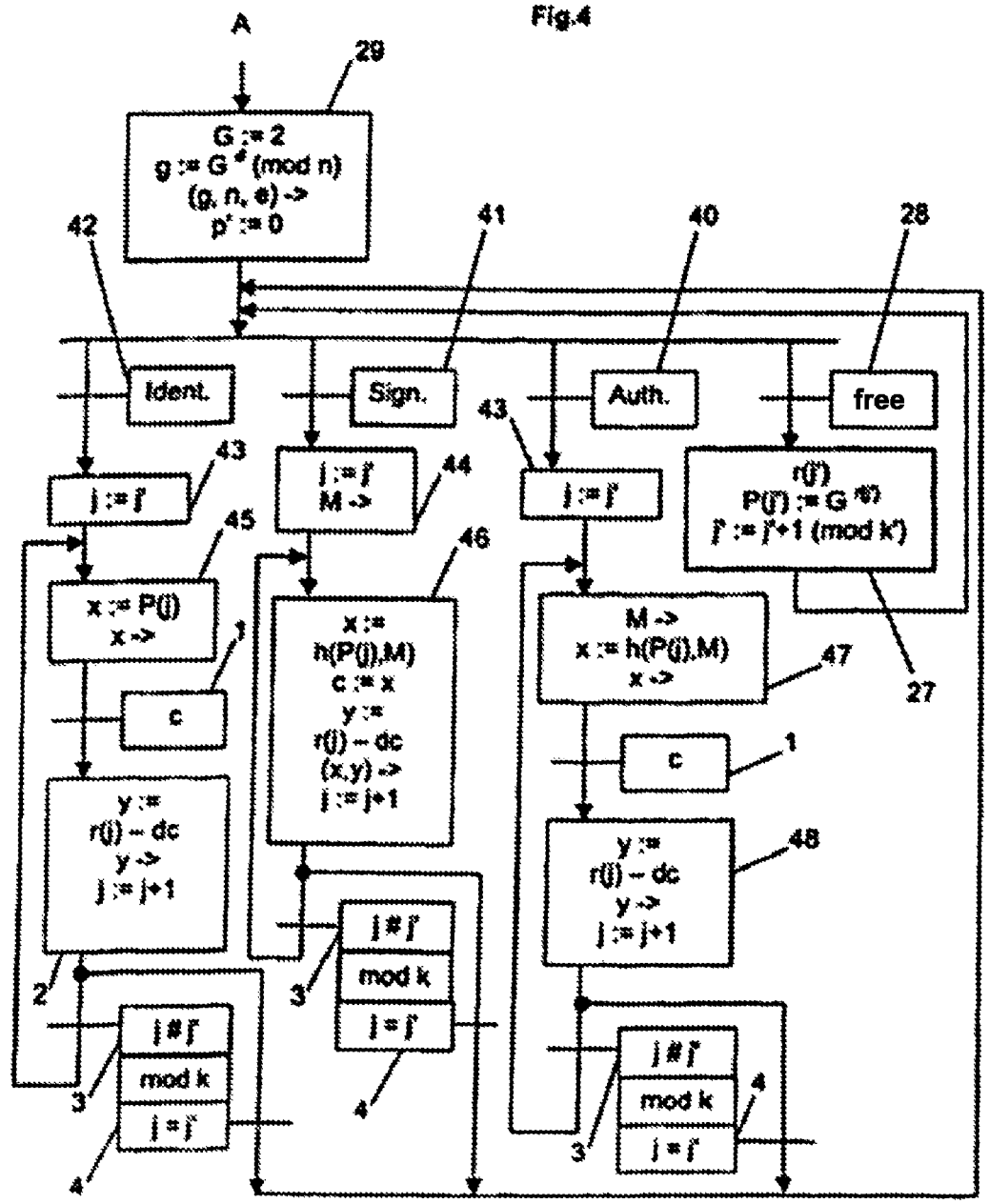
FIG. 4 shows a first variant of the authentication method for facilitating many transactions.

One particularly efficient implementation of the method of the invention will now be explained with reference to FIG. 4.

A step 27 generates, and stores in a memory of the entity A, one or more random number values r(j'), associated with each of which is a potential of proof P(j'). The index j' serves to establish, in a table, a correspondence between each random number r(j') and the associated potential of proof P(j'). Each random number r(j') is generated so as to be either substantially greater than the private key d, or less than or equal to λ(n), as explained above. Each potential of proof P(j') is calculated as a power of the simple number G with r(j') as exponent. Step 27 is executed for each row of index j' by incrementing modulo a length k' the index j' after each calculation of P(j'). The length k' represents the number of rows of the table such that, with j'=0 indexing the first row of the table, the executions of step 27 stop when j' becomes zero again or they continue in order to renew the values contained in the table. The length k' has a value equal to or greater than k.

The calculation of P(j') is carried out by the entity A or by a confidential entity that receives, from the entity A, the random number r(j') or the value λ(n) in order to choose random numbers r(j') less than or equal to λ(n). When the calculation of P(j') is carried out by the entity A, each execution of step 27 is activated by a transition 28, which is validated when digital processing means of the entity A are detected free.

The simple number G is determined in an initial step 29. When the generic number g is set, and therefore known to all, the entity A simply needs to communicate the public key (n,e) and the simple number G is calculated so that $G = g^e$ modulo n. When the generic number g is not set, the entity A chooses a value of G, for example G=2 and generates $g = G^d$ modulo n. The generic number g is then transmitted with the public key. The index j' is set to zero so as to start a first execution of step 27 for the first row of the table. Each end of execution of step 27 is connected back to the output of step 29 in order to scan the transition 28 and, with priority, the transitions 40, 41, 42.

The transition 42 is validated by an identification transaction, which then activates a series of steps 43 and 45.

Step 43 positions an iteration index j, for example equal to the current index j' of the table containing the random numbers and the associated potentials of proof.

In step 45, the entity A generates the first element x by simply reading the potential of proof P(j) from the table. During the transaction detected by validation of the transition 42, generation of the first element of proof therefore requires no power calculation. The first element of proof x is thus rapidly transmitted.

A transition 1 is validated by receipt of the common number c, which then activates a step 2.

In step 2, the entity A generates the second element of proof y as explained above. Since the operations are limited to a few multiplications and additions or subtractions, they require little computation time. The second element of proof y is thus transmitted rapidly after receipt of the common number c.

In step 2, the index j is increased by a unitary increment so as to repeat step 45 and step 2, as long as j is detected in a transition 3, different from j' modulo k, until a transition 4 detects that j is equal to j' modulo k, in order to return to the output of step 29 after k executions of step 45.

The transition 41 is validated by a signature transaction of the message M. The transition 41 then activates a series of steps 44 and 46.

Step 44 positions an iteration index j, for example equal to the current index j' of the table containing the random numbers and the associated potentials of proof. The message M is transmitted at step 44.

In step 46, the entity A generates the first element of proof x by applying the standard hash function h( ) to the message M and to the result of simply reading the potential of proof P(j) from the table. The common number c is taken equal to the first element of proof x.

In step 46, the entity A generates the second element of proof y as explained above. Since the operations are limited to a few multiplications and additions or subtractions, they require little computation time. During the transaction detected by validation of the transition 41, generation of the signature consisting of the first element of proof x and the second element of proof y, therefore requires no power calculation. The signature (x,y) is thus rapidly transmitted.

Optionally in step 46, the index j is increased by a unitary increment so as to repeat step 46 as long as j is detected in a transition 3, different from j' modulo k, until a transition 4 detects that j is equal to j' modulo k in order to return to the output of step 29 after k executions of step 46.

The transition 40 is validated by a transaction for authenticating the message M. The transition 40 then activates a series of steps 43 and 47.

Step 43 positions an iteration index j, for example equal to the current index j' of the table containing the random numbers and the associated potentials of proof.

In step 47, the entity A transmits the message M and the first element of proof x. The first element of proof x is generated by applying the standard hash function h( ) to the message M and to the result of simply reading the potential of proof P(j) from the table.

During the transaction detected by validation of the transition 40, generation of the first element of proof therefore requires no power calculation. The first element of proof x is thus rapidly transmitted.

A transition 1 is validated by receipt of the common number c, which then activates a step 48.

In step 48, the entity A generates the second element of proof y as explained above. Since the operations are limited to a few multiplications and additions or subtractions, they require little computation time. The second element of proof y is thus rapidly transmitted after receipt of the common number c.

In step 48, the index p is increased by a unitary increment so as to repeat step 47 and step 48 as long as j is detected in a transition 3, different from j' modulo k, until a transition 4 detects that p is equal to j' modulo k in order to return to the output of step 29 after k executions of step 47.

Figure 6:
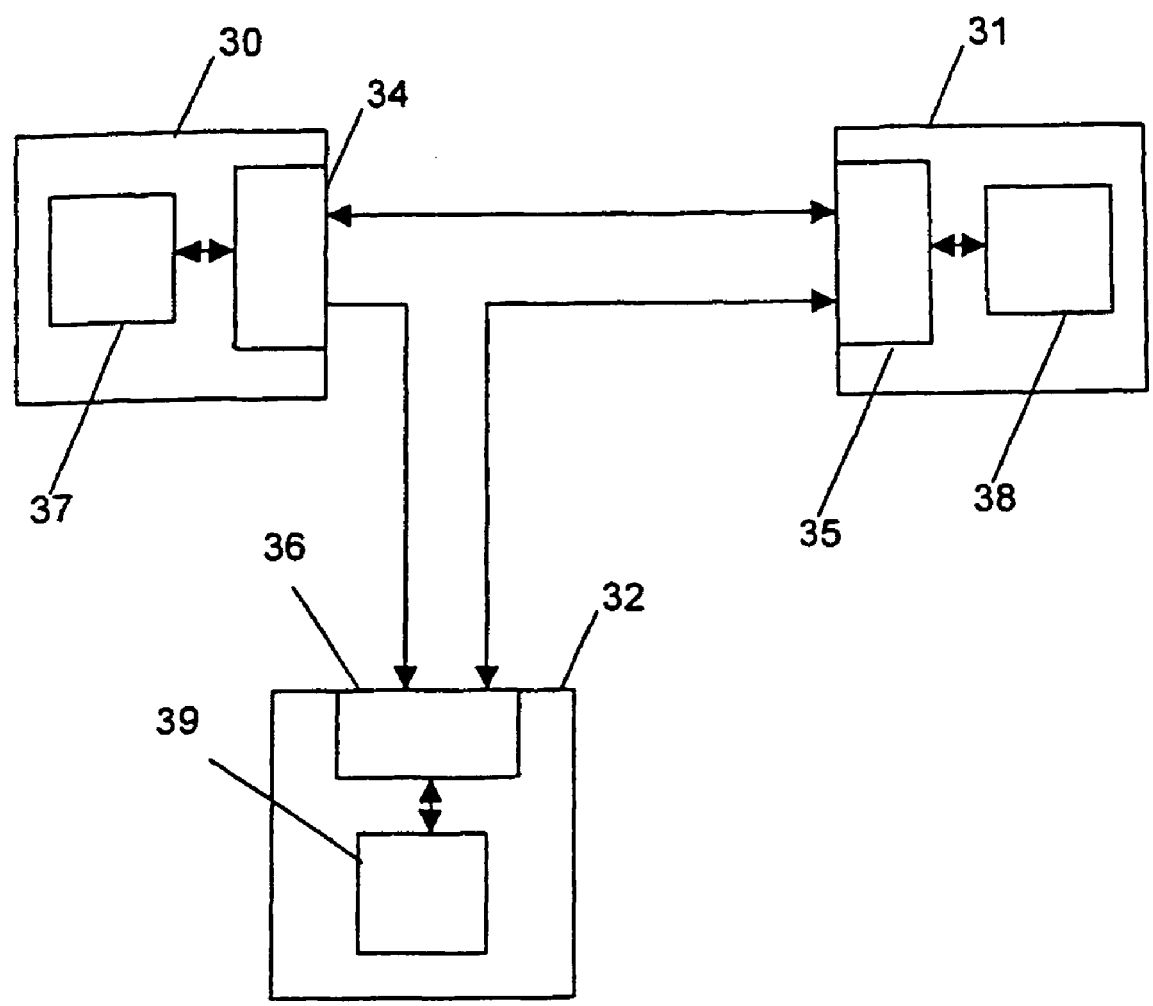
FIG. 6 shows an embodiment of a system on which the methods described herein may be implemented.

Referring to FIG. 6, the entities A, B and C described above are formed physically by a prover device 30, a verifier device 31 and an intermediate device 32 respectively. The prover device 30 is for example a microprocessor card, such as a credit card or a mobile telephone subscriber identification card. The verifier device 31 is for example a bank terminal or an electronic commerce server, or mobile telecommunication operator equipment. The intermediate device 32 is for example a microprocessor card extension, a credit card read terminal or a mobile telephone electronic card.

The prover device 30 includes communication means 34 and calculation means 37. The prover device 30 is protected from intrusion. The communication means 34 is designed to transmit the first element of proof x, in accordance with step 9, 45 or 47, described with reference to FIG. 1, 3 or 4, the second element of proof y, in accordance with step 13 described with reference to FIGS. 1 and 3, at step 24 described with reference to FIG. 2 or at steps 2 and 48 described with reference to FIG. 4, the message M, in accordance with steps 19, 20, 44 or 47 described with reference to FIGS. 1 to 4, or the common number c, in accordance with step 24, 46 described with reference to FIGS. 2 and 4, depending on the version of the method to be implemented. The communication means 34 is also designed to receive the common number c, in accordance with the transition 12 or 1 described with reference to FIGS. 1 to 4, when versions of the method to be implemented correspond to identification or to authentication. For a version of the method to be implemented corresponding to a signature, the communication means 34 do not need to be designed to receive the common number c.

The calculation means 37 is designed to execute steps 9 and 13 described with reference to FIG. 1 or 5, steps 18, 19, 23 and 24 described with reference to FIG. 2, and steps 13 and 20 described with reference to FIG. 3 or the steps described with reference to FIG. 4, depending on the version of the method to be implemented. The calculation means 37 comprise, in a known manner, a microprocessor and microprograms or combinatory circuits dedicated to the calculations described above.

The verifier device 31 includes communication means 35 and calculation means 38. The communication means 35 is designed to transmit one or more common numbers c, in accordance with step 11 described with reference to FIGS. 1, 3 and 5, when versions of the method to be implemented correspond to authentication. For a version of the method to be implemented corresponding to a signature, the communication means 35 have no need to be designed to transmit the common number c. The communication means 35 is also designed to receive the two elements of proof x and y, in accordance with the transitions 10 and 16 described with reference to FIGS. 1 to 3 and 5, a message M with the first element of proof x and the second element of proof y, in accordance with the transitions 21 and 16 described with reference to FIG. 3, or the second element of proof and the message M with one or more common numbers c and the private key image y, in accordance with the transitions 2 and 8 described with reference to FIG. 5.

The calculation means 38 is designed to execute steps 11 and 17 described with reference to FIGS. 1 and 5, step 26 described with reference to FIG. 2 or steps 11 and 22 described with reference to FIG. 3, depending on the version of the method to be implemented. The calculation means 38 comprise, in a known manner, a microprocessor and microprograms or combinatory circuits dedicated to the calculations described above.

The intermediate device 32 includes communication means 36 and calculations means 39. The communication means 36 is designed to transmit the third element of proof Y in accordance with step 15 described with reference to FIG. 5. The communication means 36 is also designed to receive the second element of proof y in accordance with the transition 14 described with reference to FIG. 5.

The calculation means 39 is designed to execute step 15 described with reference to FIG. 5. The calculation means 39 comprise, in a known manner, a microprocessor and programs or combinatory circuits dedicated to the calculations described above.

As an improvement, the calculation and communication means described above are designed to repeat the execution of the steps described above k times, each time for a first element of proof and a second element of proof that are different.

The invention claimed is:

1. A cryptographic method for a transaction whereby a first entity generates, by means of an RSA private key, a proof verifiable by a second entity by means of an RSA public key associated with said private key, said public key comprising a public key exponent and a modulus, the method comprising the steps of:

generating, on a processor at the first entity, a first element of proof by using a generic number raised to a first power, modulo the modulus, having a first exponent equal to the public key exponent multiplied by a random integer kept secret by the first entity, whereby calculation of said first element of proof is executable independently of the transaction;

generating, at the first entity, a second element of proof related to the first element of proof and dependent on a common number shared by the first and second entities specifically for the transaction; and verifying, at the second entity, that the first element of proof is related through a relationship with a second power, modulo the modulus, of a generic number having a second exponent equal to a linear combination of at least part of the common number and of the public key exponent multiplied by the second element of proof wherein the second element of proof is generated by the first entity by subtracting, from the random integer, the private key multiplied by the common number, wherein the linear combination equal to the second exponent comprises a positive unitary coefficient for the common number and a positive unitary coefficient for the public key exponent multiplied by the second element of proof, and wherein, in the verified relationship, the first element of proof is considered with a unitary exponent power.

2. The cryptographic method as claimed in claim 1, wherein, for identifying the first entity, the first element of proof is generated by the first entity by raising the generic number to a first power modulo the modulus having a first exponent equal to the public key exponent multiplied by a random integer kept secret by the first entity, wherein the common number is chosen randomly from within a security interval [0,t 1] and then sent by the second entity after having received the first element of proof, and wherein the relationship verified by the second entity is an equality relationship between a power of the first element of proof and the first power of the generic number.

3. The cryptographic method as claimed in claim 2, wherein the common number comprises first and second elementary common numbers, wherein the second element of proof is generated by the first entity by subtracting, from the random integer multiplied by the first elementary common number, the private key multiplied by the second elementary common number, wherein the linear combination equal to the second exponent comprises a zero coefficient for the first elementary common number, a positive unitary coefficient for the second elementary common number and a positive unitary coefficient for the public key exponent multiplied by the second element of proof, and wherein, in the verified relationship, the first element of proof is considered with an exponent power equal to the first elementary common number.

4. The cryptographic method as claimed in claim 3, wherein the second element of proof is calculated modulo an image of the modulus via a Carmichael function or modulo a multiple of the order of the generic number modulo the modulus.

5. The cryptographic method as claimed in claim 4, wherein the random integer is less than an image of the modulus via a Carmichael function or less than a multiple of the order of the generic number modulo the modulus.

6. The cryptographic method as claimed in claim 3, wherein the first exponent is calculated modulo an image of the modulus via a Carmichael function or modulo a multiple of the order of the generic number modulo the modulus.

7. The cryptographic method as claimed in claim 1, wherein for signing a message, the first element of proof is generated by the first entity by applying a hash function to the message and to the generic number, raised to a first power, modulo the modulus, having a first exponent equal to the public key exponent multiplied by a random integer kept secret by the first entity, wherein the common number is equal to the first element of proof, and wherein the relationship verified by the second entity is an equality relationship between the first element of proof and a result of said hash function applied to the message and to the first power of the generic number.

8. The cryptographic method as claimed in claim 7, wherein the second element of proof is generated by the first entity by subtracting, from the random integer, the private key multiplied by the common number, wherein the linear combination equal to the second exponent comprises a positive unitary coefficient for the common number and a positive unitary coefficient for the public key exponent multiplied by the second element of proof, and wherein, in the verified relationship, the first element of proof is considered with a unitary exponent power.

9. The cryptographic method as claimed in claim 8, wherein the second element of proof is calculated modulo an image of the modulus via a Carmichael function or modulo a multiple of the order of the generic number modulo the modulus.

10. The cryptographic method as claimed in claim 7, wherein the random integer is less than an image of the modulus via a Carmichael function or less than a multiple of the order of the generic number modulo the modulus.

11. The cryptographic method as claimed in claim 8, wherein the first exponent is calculated modulo an image of the modulus via a Carmichael function or modulo a multiple of the order of the generic number modulo the modulus.

12. The cryptographic method as claimed in claim 1, wherein for authenticating that a message received by the second entity comes from the first entity, the first element of proof is generated by the first entity by applying a hash function to the message and to the generic number raised to a first power, modulo the modulus, having a first exponent equal to the public key exponent multiplied by a random integer kept secret by the first entity, wherein the common number is chosen at random from within a security interval [0,t 1] and then sent by the second entity after having received the first element of proof, and wherein the relationship verified by the second entity is an equality relationship between the first element of proof and a result of said hash function applied to the message and to the first power of the generic number.

13. The cryptographic method as claimed in claim 12, wherein the common number comprises first and second elementary common numbers, wherein the second element of proof is generated by the first entity by subtracting, from the random integer multiplied by the first elementary common number, the private key multiplied by the second elementary common number, wherein the linear combination equal to the second exponent comprises a zero coefficient for the first elementary common number, a positive unitary coefficient for the second elementary common number and a positive unitary coefficient for the public key exponent multiplied by the second element of proof, and wherein, in the verified relationship, the first element of proof is considered with an exponent power equal to the first elementary common number.

14. The cryptographic method as claimed in claim 13, wherein the second element of proof is calculated modulo an image of the modulus via a Carmichael function or modulo a multiple of the order of the generic number modulo the modulus.

15. The cryptographic method as claimed in claim 14, wherein the random integer is less than an image of the modulus via a Carmichael function or less than a multiple of the order of the generic number modulo the modulus.

16. The cryptographic method as claimed in claim 15, wherein the first exponent is calculated modulo an image of the modulus via a Carmichael function or modulo a multiple of the order of the generic number modulo the modulus.

17. The cryptographic method as claimed in claim 13, wherein the random number is greater than the value of the private key in relation to a mathematical problem of a discrete logarithm.

18. The cryptographic method as claimed in claim 1, wherein the generic number is transmitted with the public key, the generic number being equal to a simple number raised to a power modulo the modulus with the private key as exponent.

19. The cryptographic method as claimed in claim 1, further comprising the steps of:
receiving the second element of proof at a third entity;
generating a third element of proof at the third entity by raising the generic number to a power, modulo the modulus, with the second element of proof as exponent;
sending the third element of proof to the second entity; and
at the second entity, raising the third element of proof to a power of the public key exponent, modulo the modulus, multiplying the result thereof by the generic number raised to a power whose exponent is the common number in order to verify the relationship relating the first element of proof to the second element of proof.

20. The cryptographic method as claimed in claim 1, wherein the second element of proof is calculated modulo an image of the modulus via a Carmichael function or modulo a multiple of the order of the generic number modulo the modulus.

21. The cryptographic method as claimed in claim 20, wherein the random integer is less than an image of the modulus via a Carmichael function or less than a multiple of the order of the generic number modulo the modulus.

22. The cryptographic method as claimed in claim 1, wherein the first exponent is calculated modulo an image of the modulus via a Carmichael function or modulo a multiple of the order of the generic number modulo the modulus.

23. A prover device having an RSA private key kept secret and protected against intrusions, for generating, during a transaction with a verifier device, a proof whose verification by means of a public key associated with said private key ensures that said prover device has originated said proof, said RSA public key comprising a public key exponent and a modulus, the prover device comprising:
  calculation means for generating a first element of proof completely or partly independently of the transaction, said first element of proof being generated by said prover device by raising a generic number to a first power, modulo the modulus, having a first exponent equal to the public key exponent multiplied by a random integer kept secret by the prover device, and for generating a second element of proof related to the first element of proof and dependent on a common number specific to the transaction; and
  communication means for transmitting at least the first and second elements of proof and for transmitting said common number to the verifier device or receiving said common number from the verifier device,
  wherein the calculation means is designed to generate the second element of proof by taking the difference between the random integer and the private key multiplied by the common number or, where the common number is split into two elementary common numbers, by subtracting from the random integer multiplied by the first elementary common number, the private key multiplied by the second elementary common number.

24. The prover device as claimed in claim 23, wherein the calculation means is designed to carry out operations modulo an image of the modulus via a Carmichael function or modulo a multiple of the order of the generic number modulo the modulus.

25. A verifier device for verifying that a proof originates from a prover device provided with an RSA private key kept secret by the prover device, by means of a public key associated with said private key, said RSA public key comprising a public key exponent and a modulus, the verifier device comprising:
  communication means for receiving a first element of proof, which includes at least the result of a first power, modulo the modulus, of a generic number raised to the power of a first exponent equal to the public key exponent multiplied by a random integer, and a second element of proof or a third element of proof, and for receiving or transmitting a common number specific to a transaction within which the first and the second or the third element of proof are received; and
  calculation means for verifying that the first element of proof is related through a relationship, modulo the modulus, with a second power of the generic number having a second exponent equal to a linear combination of at least part of the common number and of the public key exponent multiplied by the second element of proof,
  wherein the second element of proof is generated by the first entity by subtracting, from the random integer, the private key multiplied by the common number, wherein the linear combination equal to the second exponent comprises a positive unitary coefficient for the common number and a positive unitary coefficient for the public key exponent multiplied by the second element of proof, and wherein, in the verified relationship, the first element of proof is considered with a unitary exponent power.

26. The verifier device as claimed in claim 25, wherein the communication means is designed to receive the second element of proof and wherein the calculation means is designed to calculate the second exponent and said second power of the generic number.

27. The verifier device as claimed in claim 25, wherein the communication means is designed to receive the third element of proof and wherein the calculation means is designed to raise the third element of proof to a power of the public key exponent in order to multiply the result thereof by the generic number raised to a third power having the common number as exponent.

* * * * *

UNITED STATES PATENT AND TRADEMARK OFFICE
CERTIFICATE OF CORRECTION

| | |
|---|---|
| PATENT NO. | : 7,760,884 B2 |
| APPLICATION NO. | : 10/519698 |
| DATED | : July 20, 2010 |
| INVENTOR(S) | : Marc Girault et al. |

It is certified that error appears in the above-identified patent and that said Letters Patent is hereby corrected as shown below:

IN THE CLAIMS:

In Claim 10, Column 17, line 62, replace "The cryptographic method as claimed in claim 7" with -- The cryptographic method as claimed in claim 9 --

Signed and Sealed this
Fifth Day of April, 2011

David J. Kappos
*Director of the United States Patent and Trademark Office*